(12) United States Patent
Yasuma

(10) Patent No.: US 8,725,817 B2
(45) Date of Patent: May 13, 2014

(54) SERVICE DISCLOSURE DEVICE, SERVICE DISCLOSURE METHOD, AND PROGRAM

(75) Inventor: Kensuke Yasuma, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 105 days.

(21) Appl. No.: 13/104,258

(22) Filed: May 10, 2011

(65) Prior Publication Data

US 2011/0295962 A1     Dec. 1, 2011

(30) Foreign Application Priority Data

May 27, 2010   (JP) .................. 2010-121771

(51) Int. Cl.
*G06F 15/16*     (2006.01)

(52) U.S. Cl.
USPC ......................................... 709/206

(58) Field of Classification Search
USPC ................................ 709/206–208
See application file for complete search history.

(56) References Cited

U.S. PATENT DOCUMENTS

| | | | |
|---|---|---|---|
| 8,032,136 B2 * | 10/2011 | Hirata et al. ............... | 455/432.3 |
| 2005/0021786 A1 | 1/2005 | Kikkawa | |
| 2009/0129340 A1 * | 5/2009 | Handa ........................... | 370/331 |
| 2009/0265443 A1 * | 10/2009 | Moribe et al. ................ | 709/217 |
| 2011/0078609 A1 * | 3/2011 | Shibuya ........................ | 715/771 |

FOREIGN PATENT DOCUMENTS

| | | |
|---|---|---|
| JP | 2004-246410 A | 9/2004 |
| JP | 2006-262019 A | 9/2006 |
| JP | 2008-097368 A | 4/2008 |
| JP | 2009-540426 A | 11/2009 |
| WO | 2010/021110 A1 | 2/2010 |

* cited by examiner

*Primary Examiner* — Jason Recek

(74) *Attorney, Agent, or Firm* — Canon U.S.A., Inc., IP Division

(57) ABSTRACT

A service disclosure device receives a search message transmitted from a service using device, and if the ID of the service using device is stored in a memory, transmits a response message indicating a service to be disclosed to the service using device. The service disclosure device displays information about the service using device on a display, and if a permission to disclose the service to the service using device is input, registers the ID of the service using device in the memory. After a response limit to the search message has expired, the service disclosure device transmits a notification message indicating the service to be disclosed to the service using device.

21 Claims, 5 Drawing Sheets

SERVICE DISCLOSURE DEVICE, SERVICE DISCLOSURE METHOD, AND PROGRAM

BACKGROUND OF THE INVENTION

1. Field of the Invention

The present invention relates to a service disclosure device and a service disclosure method for disclosing a service to a network, and a program.

2. Description of the Related Art

There are conventionally known techniques that disclose a service on a network, when a device accesses the network, and receive an execution request of the service. Such techniques include, for example, Universal Plug and Play (UPnP).

In such techniques, United States Patent Publication Application No. 2005/0021786 discusses a technique that when a service receives a packet from a control point, determination whether a MAC address of the control point is registered is performed, and if the MAC address is not registered, the access is denied. In the technique discussed in United States Patent Publication Application No. 2005/0021786, the control point transmits a registration request of the MAC address, and the service that received the registration request registers the MAC address.

In such a system for uniformly disclosing a UPnP/digital living network alliance (DLNA) service to a connected network, there is an issue that an unintended third party can use functions (e.g. discovery using a simple service discovery protocol (SSDP), an operation using a simple object access protocol (SOAP), or event notification using a general event notification architecture (GENA)).

Further, in the technique discussed in United States Patent Publication Application No. 2005/0021786, the control point has to have a function of transmitting a registration request of the MAC address, and the service has to have a function of receiving the registration request of the MAC address. Consequently, to both of the control point and the service, the additional functions are to be provided. Then, if the additional functions are not provided to the control point, the registration request of the MAC address is not transmitted from the control point, so that communication cannot be established.

SUMMARY OF THE INVENTION

The present invention relates to a service disclosure device and a service disclosure method capable of disclosing a service to a service using device that does not have a registration function in a limited manner, and a program.

According to an aspect of the present invention, a service disclosure device capable of disclosing a service via a network to a service using device includes a reception unit configured to receive a search message transmitted from the service using device, a display unit configured to display information about the service using device that transmitted the search message, an input unit configured to input a disclosure permission to disclose the service to the service using device whose information is displayed on the display unit, a registration unit configured to register identification information of the service using device to which the service is permitted to disclose by the disclosure permission input via the input unit in a storage unit, and a transmission unit configured to transmit a notification message indicating the service to be disclosed to the service using device to which the service is permitted to disclose by the disclosure permission after a response limit to the search message has expired, wherein the transmission unit transmits a response message indicating the service to be disclosed to the service using device if the identification information of the service using device is stored in the storage unit when the search message is received.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
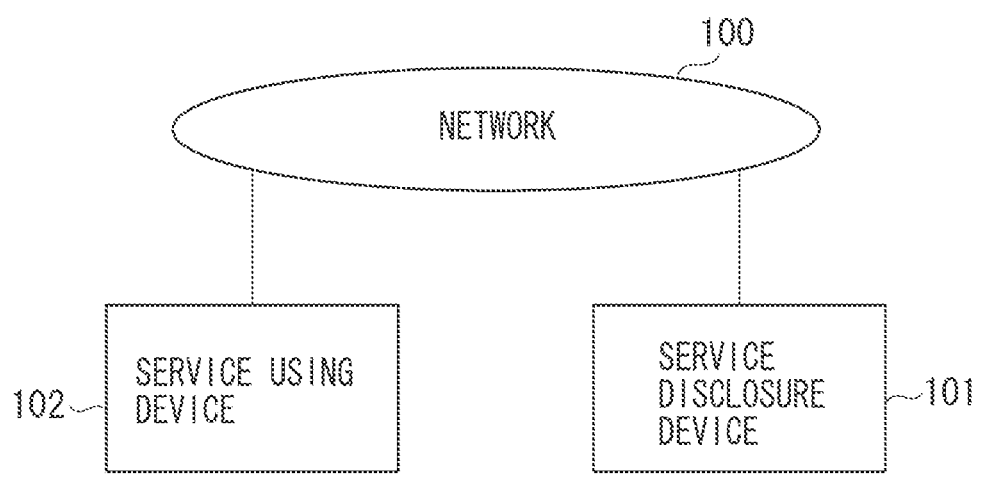
FIG. 1 illustrates a network configuration according to an exemplary embodiment of the present invention.

FIG. 1 illustrates a network configuration according to an exemplary embodiment of the present invention.

A network 100 is configured with a local area network (LAN), or an ad hoc network. A service disclosure device (hereinafter, referred to as disclosure device) 101 discloses a service to a network. In the present exemplary embodiment, the disclosure device 101 is a Universal Plug and Play (UPnP) device. A service using device (hereinafter, referred to as using device) 102 searches the network for a service, and uses the discovered service. In the present exemplary embodiment, the using device 102 is a UPnP control point.

In the present exemplary embodiment, the disclosure of service is performed using a SSDP included in the UPnP. However, the disclosure method is not limited to the above method, but other service disclosure methods such as web services dynamic discovery (WS-Discovery) can be employed.

Figure 2:
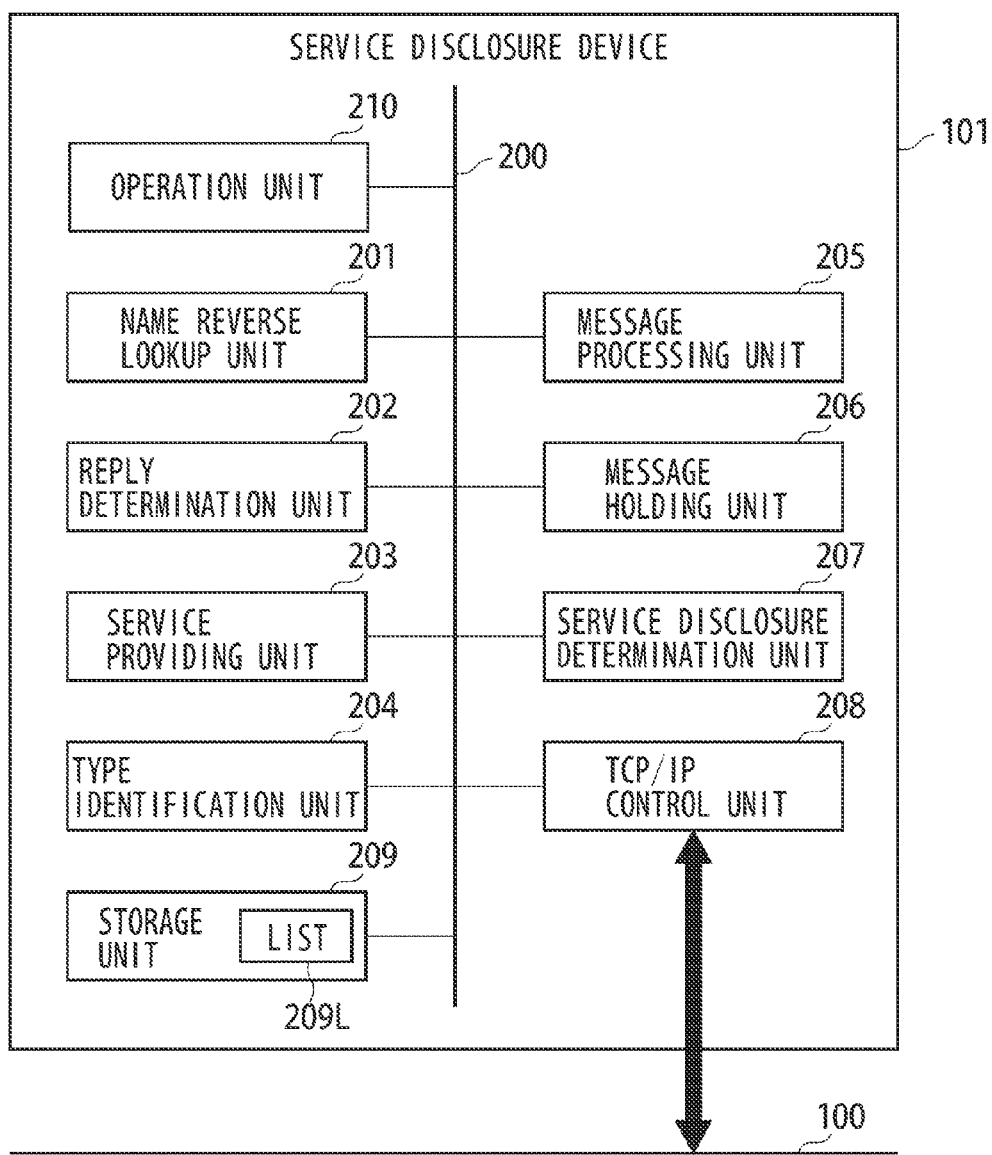
FIG. 2 illustrates a module configuration of a service disclosure device according to the exemplary embodiment of the present invention.

FIG. 2 illustrates a module configuration of the disclosure device 101 according to the present exemplary embodiment.

A name reverse lookup unit 201 performs reverse lookup of a name from a MAC address, an Internet protocol (IP) address, or an identifier of the using device 102. If the MAC address is used, the name reverse lookup unit 201 transmits an inquiry to a specific server (not illustrated) on the network 100 via a transmission control protocol/Internet protocol (TCP/IP) control unit 208 and acquires a product name or a user-defined name corresponding to the MAC address. If the IP address is used, the name reverse lookup unit 201 transmits a reverse lookup request to the domain name service (DNS) (not illustrated) via the TCP/IP control unit 208 and acquires a name of the DNS.

A reply determination unit 202 determines whether to reply to a search message from the using device 102. The reply determination unit 202 determines whether the using device 102 that transmitted the search message is on a list 209L that is stored in a storage unit 209.

A service providing unit 203 performs SOAP processing, and GENA processing. A type identification unit 204 identifies the type of the network 100 to which the device is connected. A message processing unit 205 performs processing of a message received via the network 100, and transmits a message via the network 100. A message holding unit 206 temporarily holds a message received by the message processing unit 205. A service disclosure determination unit 207 determines whether to disclose a service provided by the disclosure device 101 to the network 100.

The TCP/IP control unit 208 is connected to the network 100 and performs processing relating to a network protocol such as a TCP/IP protocol. The TCP/IP control unit 208 receives a message transmitted by the using device 102, and transmits a message to the using device 102. The disclosure device 101 further includes the storage unit 209, and an operation unit 210. The operation unit 210 includes a display unit and a key input unit. The display unit and the key input unit can be integrated by a touch panel. Each unit illustrated in FIG. 2 can be configured as a software module implemented by a computer (not illustrated) executing a computer program. Further, each unit can be configured as hardware.

Figure 3:
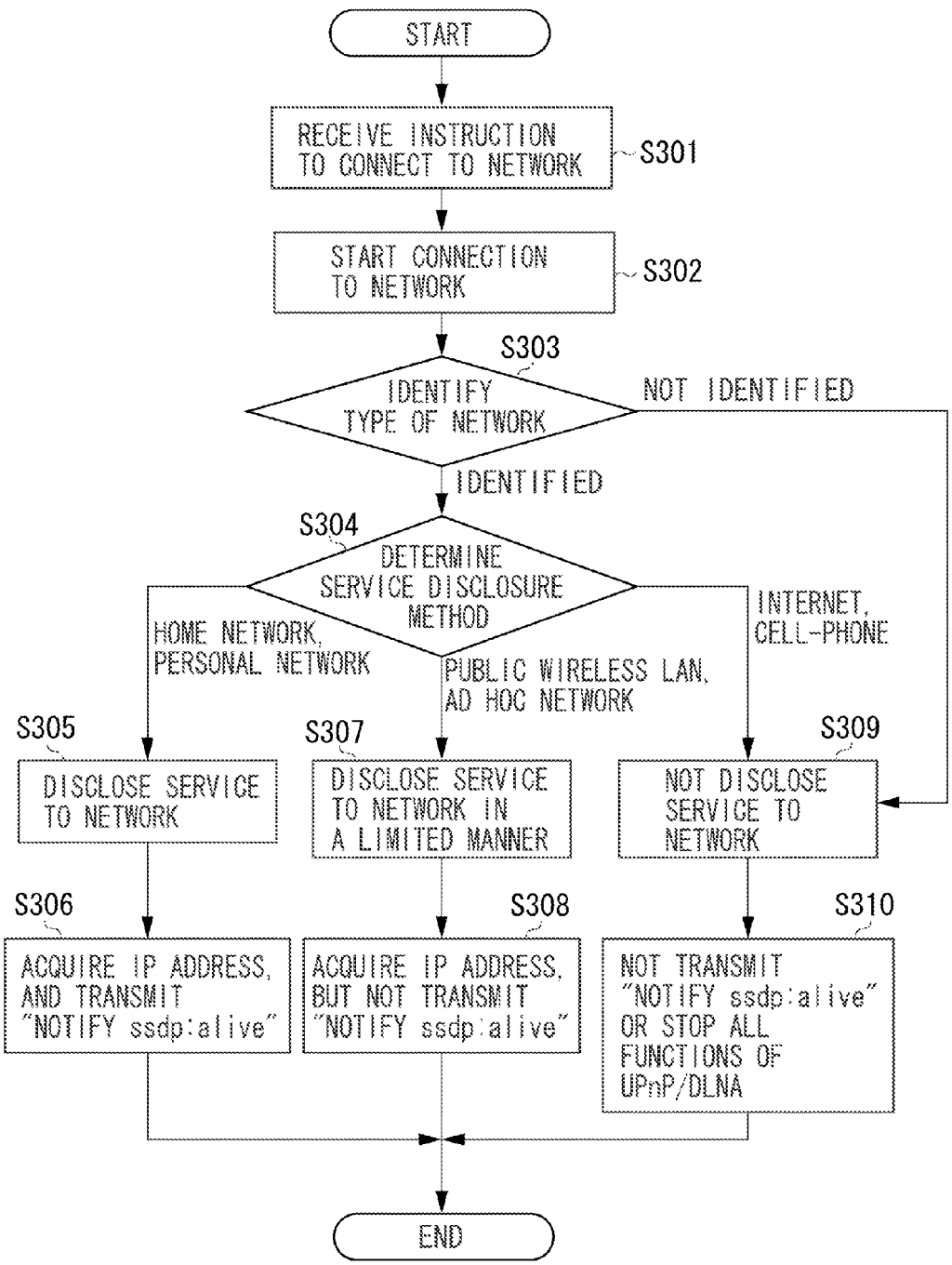
FIG. 3 is a flowchart illustrating processing performed when the service disclosure device is connected to a network.

FIG. 3 is a flowchart illustrating processing to be performed when the disclosure device 101 is connected to the network 100. The flowchart illustrates a procedure for determining a service disclosure method when the disclosure device 101 is connected to the network 100. The service disclosure method (how to disclose the service) is not limited to the method illustrated in FIG. 3, and can be set via the operation unit 210. In a system the disclosure device 101 is implemented by a computer, the flowchart shows a part of a program executed by the computer. The program is stored in a memory so that the computer can read out the program.

In step S301, the service providing unit 203 receives an instruction to connect to the network 100. Then, the processing proceeds to step S302. The connection instruction is input from the operation unit 210. In addition, connection of a network cable to the device can be regarded as the issue of the connection instruction. If there is a plurality of networks, in order to determine a network to connect with among the networks, selection by a user or selection by weighting set in advance is performed. In step S302, the service providing unit 203 starts connection to the network 100 via the TCP/IP control unit 208. Then, the processing proceeds to step S303.

In step S303, the type identification unit 204 identifies the type of the network whose connection is completed. If the type identification unit 204 determines that the type of the network can be identified, the processing proceeds to step S304. If the type identification unit 204 determines that the type of the network cannot be identified, the processing proceeds to step S309.

In step S304, the type identification unit 204 acquires the type of the network from parameters being used for the network connection. The parameters are input from the operation unit 210, and stored in the storage unit 209.

If the parameters are in an infrastructure mode, the type identification unit 204 identifies the type of the network from a value of a service set identifier (SSID) of the connected network. If the value is a value of a specific SSID, it is possible to determine that the type is a public wireless local area network (LAN). In the other cases, it is determined that the type is a home network. The SSID is received from the network 100, and stored in the storage unit 209.

If the parameters are in an ad hoc mode and parameters that are set in advance are being used, the type identification unit 204 determines that the type is a personal network. If the disclosure device 101 is temporarily connected to a network using a parameter setting technique such as WiFi protected setup extensions (WPSE), the type identification unit 204 determines that the type is an ad hoc network. In the case where the parameter setting technique such as the WPSE is being used, if it is determined that the disclosure device 101 is disconnected from the network, the TCP/IP control unit 208 deletes the set parameters.

If the disclosure device 101 is being connected to a cell-phone or an internet connection module using a universal serial bus (USB), a near field communication (NFC), or the like, the type identification unit 204 determines that the connected network is the cell-phone, and the Internet, respectively. The connection of the device to the cell-phone and the connection of the device to the internet connection module are input from the operation unit 210, and the information is stored in the storage unit 209. Alternatively, from the connected cell-phone or the internet connection module, a notification that the connected device is the cell-phone or the internet connection module can be transmitted, and the result can be stored in the storage unit 209.

If the type identification unit 204 determines that the network 100 is the home network or the personal network, the processing proceeds to step S305. If the type identification unit 204 determines that the network 100 is the public wireless LAN or the ad hoc network, the processing proceeds to step S307. If the type identification unit 204 determines that the network 100 is the cell-phone or the Internet, the processing proceeds to step S309.

The determination by type identification unit 204 is not limited to the above-described method, and the determination can be implemented by other methods. For example, parameters indicating the type of the network can be acquired from the network 100, or the determination can be made from a network prefix contained in an IPv6 Router Advertisement.

In step S305, the service disclosure determination unit 207 determines to disclose the service to the network. Then, the processing proceeds to step S306. In step S306, after the TCP/IP control unit 208 acquires an IP address of the service disclosure device 101, the message processing unit 205 transmits "NOTIFY ssdp:alive" containing its IP address to the network 100 via the TCP/IP control unit 208. The service providing unit 203 starts to provide a SOAP and a GENA to the network 100 via the TCP/IP control unit 208, and ends the processing.

In step S307, the service disclosure determination unit 207 determines to disclose the service to the network in a limited way. Then, the processing proceeds to step S308. In step S308, after the IP address is acquired, the message processing unit 205 ends the processing without transmitting "NOTIFY ssdp:alive" to the network 100. The message processing unit 205 also does not transmit "NOTIFY ssdp:alive" that is to be regularly transmitted to the network 100.

In step S309, the service disclosure determination unit 207 determines not to disclose the service to the network. Then, the processing proceeds to step S310. In step S310, the message processing unit 205 determines not to transmit "NOTIFY ssdp:alive" to the network 100, and stops the SSDP. Further, the service providing unit 203 stops the SOAP and the GENA to the network 100, and ends the processing. The result determined in step S304 is stored in the storage unit 209. As described above, the type identification unit 204 determines the type of the access network (step S303), and according to the type of the access network determined by the type identification unit 204, the service disclosure determination unit 207 determines the disclosure method of the service (step S304).

The service disclosure methods are not limited to three methods, that is "disclosure", "limited disclosure", and "non-disclosure", but two methods of "disclosure" and "limited disclosure", or two methods of "limited disclosure" and "non-disclosure" can be employed. In FIG. 3, the service disclosure method is determined according to the type of the connected network. However, the service disclosure method can be set from the operation unit 210. Further, the disclosure method determined by the procedure illustrated in FIG. 3 can be changed via the operation unit 210. The service disclosure methods can be the three methods of "disclosure", "limited disclosure", and "non-disclosure", two methods of "disclosure" and "limited disclosure", or two methods of "limited disclosure" and "non-disclosure". Further, the service disclosure method can be one method of "limited disclosure".

Figure 4:
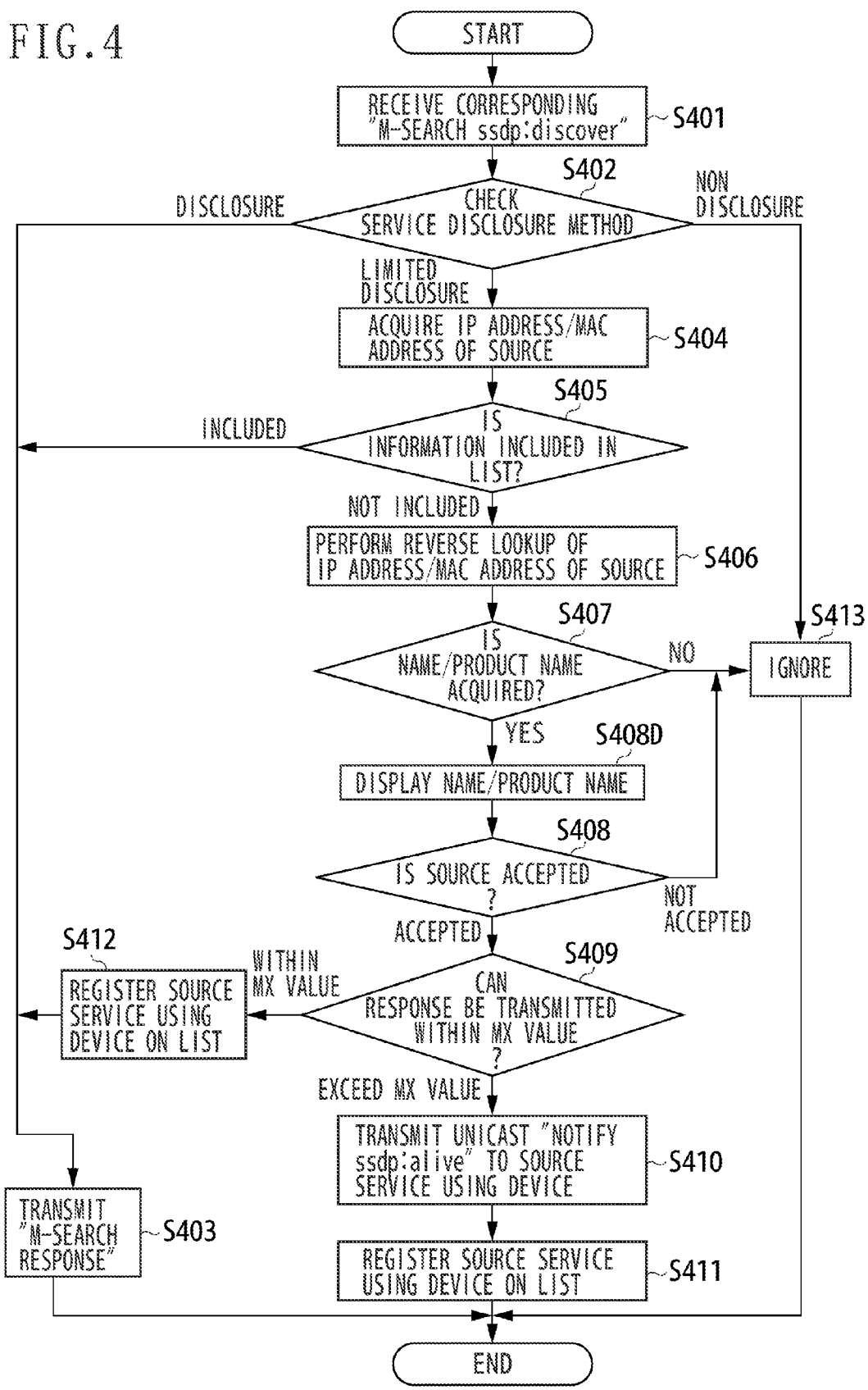
FIG. 4 is a flowchart illustrating processing performed when the service disclosure device receives an M-SEARCH message from a service using device.

FIG. 4 is a flowchart illustrating processing performed when the service disclosure device 101 receives an M-SEARCH message from the service using device 102. In a system the disclosure device 101 is implemented by a computer, the flowchart shows a part of a program executed by the computer. The program is stored in a memory so that the computer can read out the program.

In step S401, the message processing unit 205 receives "M-SEARCH ssdp:discovery" relating to its own device via the TCP/IP control unit 208. Then, the processing proceeds to step S402. The message "M-SEARCH ssdp:discovery" is a search message for inquiring about the service of the disclosure device 101.

In step S402, the service disclosure determination unit 207 checks the service disclosure method determined when the device is connected to the network as described in FIG. 3. The service disclosure method can be set via the operation unit 210 instead of determining according to the connected network as described in FIG. 3.

In step S402, if the service disclosure determination unit 207 determines that the service disclosure method is "disclosure", the processing proceeds to step S403. If the service disclosure determination unit 207 determines that the service disclosure method is "limited disclosure", the processing proceeds to step S404. Further, if the service disclosure determination unit 207 determines that the service disclosure method is "non-disclosure", the processing proceeds to step S413.

The service disclosure methods are not limited to the three methods, that is "disclosure", "limited disclosure", and "non-disclosure", but two methods of "disclosure" and "limited disclosure", or two methods of "limited disclosure" and "non-disclosure" can be employed. Further, the service disclosure method can be only one method of "limited disclosure". In the case where the disclosure method is one method of "limited disclosure", the determination in step S402 is not necessary. Thus, the processing directly proceeds from step S401 to step S404.

In step S403, the message processing unit 205 returns "M-SEARCH RESPONSE" via the TCP/IP control unit 208 to the using device 102 that transmitted "M-SEARCH ssdp:discovery", and ends the processing.

In step S404, the reply determination unit 202 acquires a MAC address of the using device 102 that transmitted "M-SEARCH ssdp:discovery", and the processing proceeds to step S405. In the present exemplary embodiment, the reply determination unit 202 acquires the MAC address by referring to a transmission source header of "M-SEARCH ssdp:discovery". In the present exemplary embodiment, the MAC address is used, however, it is not limited to the MAC address. An IP address, an identifier, or something corresponding to the identifier transmitted from the using device 102 can be used.

In step S405, the reply determination unit 202 determines whether the list 209L stored in the storage unit 209 includes the using device 102 that transmitted "M-SEARCH ssdp:discovery". In the list 209L of the service using devices stored in the storage unit 209, in addition to the MAC address, an IP address, a product name, and a user-defined name can be stored. The MAC address can be described as, for example, "11:22:33:44:55:66", and the user-defined name can be described as, for example, "ICHIRO'S CAMERA". In the present exemplary embodiment, the reply determination unit 202 performs the determination whether the list 209L includes the using device 102 or not by matching of the MAC address. The MAC address contained in the transmission source header of "M-SEARCH ssdp:discovery" is identification information of the using device 102. The list 209L is storage means for storing the identification information.

If the reply determination unit 202 determines that the stored list 209L includes the using device 102 (INCLUDED in S405), the processing proceeds to step S403. If the reply determination unit 202 determines that the stored list 209L does not include the using device 102 (NOT INCLUDED in S405), the processing proceeds to step S406. More specifically, if the MAC address of the using device 102 is stored in the list 209L at the time when "M-SEARCH ssdp:discovery" is received, "M-SEARCH RESPONSE" for service disclosure is transmitted to the using device 102. The message "M-SEARCH RESPONSE" is a response message for the service disclosure.

As described above, when the search message is received in the TCP/IP control unit 208 (step S402), the disclosure device 101 determines whether the identification information of the using device 102 is stored in the list 209L (step S405). If the identification information is stored, the response message for the service disclosure is transmitted from the TCP/IP control unit 208 to the using device 102 (step S403).

In step S406, the name reverse lookup unit 201 transmits an inquiry of name reverse lookup to a server on the network 100 using the MAC address of the using device 102 that transmitted "M-SEARCH ssdp:discovery" as a key. Then, the processing proceeds to step S407. The server is connected to the network 100, however, the server is not illustrated. More specifically, the name reverse lookup unit 201 performs an acquisition procedure for acquiring the name that is information about the using device 102 that transmitted "M-SEARCH ssdp:discovery".

In the present exemplary embodiment, using the MAC address as the key, the inquiry of the name reverse lookup is performed to the server. However, it is not limited to the MAC address, and an IP address, or the like can be used. In the present exemplary embodiment, the name is inquired from the server. However, it is not limited to the name, and an inquiry for relevant information of the using device 102 including the name of the service itself, the name unique to the device, the product name, and the specifications can be performed. Moreover, in the present exemplary embodiment, though the server is used, as long as the using device 102 can perform the name reverse lookup processing, the inquiry can be directly performed to the using device 102.

In step S407, if the name reverse lookup unit 201 determines that the name (user-defined name) or the product name of the transmission source can be acquired (YES in step S407), the processing proceeds to step S408D. If the name reverse lookup unit 201 determines that the name or the product name cannot be acquired (NO in step S407), the processing proceeds to step S413. If the name or the product name can be acquired, the reply determination unit 202 determines whether to accept the using device 102 that transmitted "M-SEARCH ssdp:discovery". Until the reply determination unit 202 determines whether to accept the device 102, the message holding unit 206 holds the response to "M-SEARCH ssdp:discovery".

Figure 5:
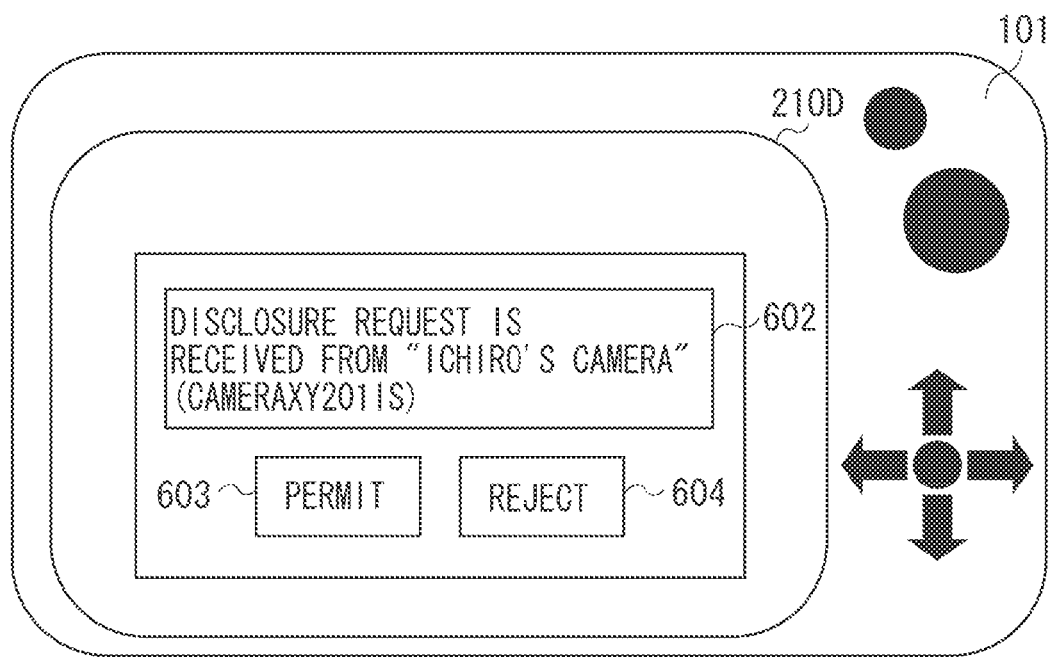
FIG. 5 illustrates a window on a user interface of the service disclosure device.

In step S408D, the reply determination unit 202 displays a window for accepting the using device 102 on a user interface of the disclosure device 101 on a display portion 210D of the operation unit 210 (see FIG. 5).

On the window, for example, a display 602 indicating the reception of the disclosure request from the using device 102 of the name (user-defined name or product name) acquired in step S407, and buttons 603 and 604 for permitting or rejecting the disclosure request are displayed. More specifically, as the display 602, a message "DISCLOSURE REQUEST IS RECEIVED FROM "ICHIRO'S CAMERA" (CAMERAXY20IS)" is displayed. Further, using the key input part of the operation unit 210, one of the buttons 603 and 604 of "PERMIT" and "REJECT" can be selected. The name of the using device 102 displayed on the display portion 210D is information about the using device 102 that transmitted "M-SEARCH ssdp:discovery".

In step S408, if the user specifies the button 603 of "PERMIT" on the window displayed on the display portion 210D of the disclosure device 101, the reply determination unit 202 determines to accept the using device 102 (ACCEPTED in step S408). Then, the processing proceeds to step S409. By specifying the button 603 of "PERMIT", transmission permission of the response message to the using device 102 whose name is being displayed on the display portion 210D is input. By the response message, the using device 102 is notified of the service of the disclosure device 101.

On the other hand, if the user specifies the button 604 of "REJECT" on the window or it is determined as a time-out period that a certain time period has passed, the reply determination unit 202 determines not to accept the using device 102 (NOT ACCEPTED in step S408). Then, the processing proceeds to step S413.

In the present exemplary embodiment, the determination is performed using the user interface. However, it is not limited to the above configuration, the reply determination unit 202 can determine whether to accept the using device 102 according to the using device 102 of the MAC address, the name, or the product name stored in the list 209L stored in the storage unit 209.

In step S409, the message processing unit 205 acquires the time-out period for the response from a MX value contained in "M-SEARCH ssdp:discovery", and determines whether the response can be made within the MX value. The MX value is a transmission time limit for "M-SEARCH RESPONSE". The using device 102 is required to transmit "M-SEARCH RESPONSE" within the MX value after "M-SEARCH ssdp:discovery" is received.

In the present exemplary embodiment, since the UPnP is used, the MX value is contained in "M-SEARCH ssdp:discovery", however, if the MX value is not contained, for example, in WS-Discovery, a value set to the storage unit 209 in advance can be used.

If the message processing unit 205 determines that the response can be made within the MX value (WITHIN MX VALUE in step S409), the processing proceeds to step S412. If the message processing unit 205 determines that the response cannot be made within the MX value (EXCEED MX VALUE in step S409), the processing proceeds to step S410.

As compared to the processing of the reply determination unit 202, in an exemplary embodiment in which the MX value is sufficiently small and the processing is likely to proceed from step S409 to step S410, the processing in step S409 can be skipped and the processing proceeds from step S408 to step S410. Further, as compared to the processing of the reply determination unit 202, in an exemplary embodiment in which the MX value is sufficiently large and the processing is likely to proceed from step S409 to step S412, the processing in step S409 can be skipped and the processing proceeds from step S408 to step S412. Further, if the transmission is permitted in step S408, after the MX value is expired, the processing can proceed to step S410.

In step S410, the message processing unit 205 transmits unicast "NOTIFY ssdp:alive" to the using device 102 that transmitted "M-SEARCH ssdp:discovery", and the processing proceeds to step S411. More specifically, after the MX value that is the transmission time limit of "M-SEARCH RESPONSE" has expired, the message processing unit 205 transmits unicast "NOTIFY ssdp:alive" to the using device 102 that is permitted by the transmission permission from the operation unit 210. The unicast message "NOTIFY ssdp:alive" is a notification message for the service disclosure.

If the processing is performed using UPnP, there is some using device 102 that cannot receive the unicast message "NOTIFY ssdp:alive" that is not a standard message. In such a case, when the using device 102 transmits "M-SEARCH ssdp:discovery" next time, the disclosure device 101 replies to the massage, so that the disclosure device 101 can be found. In an exemplary embodiment in which the existence of the using device 102 that cannot receive "NOTIFY ssdp:alive" is known in advance, the processing in step S410 can be skipped and the processing proceeds from step S409 to step S411.

In step S411, the reply determination unit 202 registers the information about the using device 102 such as the MAC address, the name, and the product name in the list 209L in the storage unit 209, and ends the processing. Also in step S412, the reply determination unit 202 registers the information about the using device 102 such as the MAC address, the name, and the product name in the list 209L, and the processing proceeds to step S403.

In steps S411 and S412, the reply determination unit 202 registers the identification information such as the MAC address of the using device 102 that is permitted to transmit the response message by the transmission permission input from the operation unit 210 in the list 209L. The identification information to be registered in the list 209L can include a network address other than the MAC address.

The processing proceeds from step S412 to step S403, and the message processing unit 205 transmits "M-SEARCH RESPONSE" to the using device 102 that is permitted by the transmission permission from the operation unit 210. The message "M-SEARCH RESPONSE" is transmitted before the MX value that is the transmission time limit of the message "M-SEARCH RESPONSE" expires.

As described above, the disclosure device 101 displays the name of the using device 102 that transmitted the search message on the operation unit 210 (step S408D). If the transmission permission of the response message to the using device 102 whose name is displayed is input from the operation unit 210 (step S408), the disclosure device 101 registers the using device 102 that is permitted to transmit the response message in the list 209L (steps S411 and S412).

In step S413, the service providing unit 203 and the message processing unit 205 determine to ignore the message from the using device 102, and ends the processing. The method for identifying the message can be performed by identifying the MAC address. In the present exemplary embodiment, the message identification method is performed using the MAC address, however, the identification can be performed using an IP address or an identifier of another using device 102.

More specifically, the disclosure device 101 performs the service disclosure procedure for disclosing the service to the using device 102 via the network 100. In the service disclosure procedure, first, the TCP/IP control unit 208 performs the reception procedure for receiving a search message transmitted from the using device 102 (step S401). If the identification information of the using device 102 is stored in the list 209L when the search message is received, the message processing unit 205 performs the transmission procedure for transmitting a response message for service disclosure to the service using device (step S403).

On the other hand, the reply determination unit 202 performs the display procedure for displaying the information about the using device 102 that transmitted the search message such as the name on the operation unit 210 (step S408D). The reply determination unit 202 determines whether the transmission permission of the response message to the using device 102 whose information such as the name is displayed on the operation unit 210 is input from the operation unit 210 (step S408).

If the transmission permission is input, the reply determination unit 202 performs the registration procedure for registering the identification information of the using device 102 that is permitted to transmit the response message by the input transmission permission in the list 209L (steps S411 and S412). Accordingly, if the using device 102 transmits the search message again, since the identification information of the using device 102 has been registered in the list 209L, the message processing unit 205 transmits the response message for service disclosure to the using device 102.

If the transmission of the response message is permitted in step S408, after the identification information of the using device 102 is registered in the list 209L in step S412, or before the registration, the response message for service disclosure can be transmitted to the using device 102. After the transmission time limit of the response message has expired, a notification message for service disclosure can be transmitted to the permitted using device 102.

The present invention can apply to the disclosure device 101, even in a UPnP control point that the using device 102 only comply with the standard of the UPnP, the limited disclosure of the service can be performed to the using device 102. According to the exemplary embodiments of the present invention, the service is disclosed only to an arbitrary control point. Accordingly, it can prevent an unintended third party from using the functions of the service.

Further, if the using device 102 can receive unicast "NOTIFY ssdp:alive", the time until the using device 102 discovers the disclosure device 101 can be reduced.

Aspects of the present invention can also be realized by a computer of a system or apparatus (or devices such as a central processing unit (CPU) or micro-processing unit (MPU)) that reads out and executes a program recorded on a memory device (storage medium) to perform the functions of the above-described embodiments, and by a method, the steps of which are performed by a computer of a system or apparatus by, for example, reading out and executing a program recorded on a memory device to perform the functions of the above-described embodiments. For this purpose, the program may be provided to the computer for example via a network or from a recording medium of various types serving as the memory device (e.g., computer-readable medium). The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-121771 filed May 27, 2010, which is hereby incorporated by reference herein in its entirety.

What is claimed is:

1. A service disclosure apparatus capable of disclosing a service via a network to a service using device, the service disclosure apparatus comprising:
a reception unit configured to receive a search message transmitted from the service using device;
a display control unit configured to control for displaying information about the service using device that transmitted the search message;
an input unit configured to input a disclosure permission to disclose the service to the service using device whose information is displayed on the display unit;
a registration unit configured to register in a storage unit identification information of the service using device to which the service is permitted to disclose by the disclosure permission input via the input unit; and
a transmission unit configured to transmit a message indicating the service to be disclosed to the service using device to which the service is permitted to disclose by the disclosure permission,
wherein the transmission unit transmits a response message indicating the service to be disclosed to the service using device if the identification information of the service using device is stored in the storage unit when the search message is received.

2. The service disclosure apparatus according to claim 1, wherein the transmission unit transmits the response message to the service using device to which the service is permitted to disclose by the disclosure permission before the response limit to the search message expires.

3. The service disclosure apparatus according to claim 1, wherein the transmission unit performs an acquisition procedure for acquiring the information about the service using device that transmitted the search message, and the display unit displays the information about the service using device acquired according to the acquisition procedure.

4. The service disclosure apparatus according to claim 1, wherein an amount of the service to be disclosed to the service using device is set based on a type of communication infrastructure used to communicate with the service using device.

5. The service disclosure apparatus according to claim 1, further comprising an operation unit through which a user can set an amount of the service to be disclosed to the service using device.

6. The service disclosure apparatus according to claim 1, wherein the transmission unit transmits the response message indicating the service to be disclosed to the service using device regardless of whether or not the identification information of the service using device is stored in the storage unit but depending on a network to which the service disclosure apparatus is connected when the search message is received.

7. The service disclosure apparatus according to claim 1, wherein the transmission unit configured to transmit, after a response limit to the search message has expired, a notification message indicating the service to be disclosed to the service using device to which the service is permitted to disclose by the disclosure permission.

8. A method of service disclosure of a service disclosure apparatus to disclose a service via a network to a service using device, the method comprising:
   receiving a search message transmitted from the service using device;
   transmitting a response message indicating the service to be disclosed to the service using device if identification information of the service using device is stored in a storage unit when the search message is received;
   displaying information about the service using device that transmitted the search message on a display unit;
   if a disclosure permission to disclose the service to the service using device whose information is displayed on the display unit is input, registering in the storage unit the identification information of the service using device to which the service is permitted to disclose by the input disclosure permission; and
   transmitting a message indicating the service to be disclosed to the service using device to which the service is permitted to disclose by the disclosure permission.

9. The method according to claim 8, further comprising transmitting the response message to the service using device to which the service is permitted to disclose by the disclosure permission before the response limit to the search message expires.

10. The method according to claim 8, further comprising acquiring the information about the service using device that transmitted the search message, and displaying the information acquired according to an acquisition procedure.

11. The method according to claim 8, wherein an amount of the service to be disclosed to the service using device is set based on a type of communication infrastructure used to communicate with the service using device.

12. The method according to claim 8, further comprising using an operation unit of the service disclosure apparatus to set an amount of the service to be disclosed to the service using device.

13. The method according to claim 8, wherein the response message indicating the service to be disclosed to the service using device is transmitted regardless of whether or not the identification information of the service using device is stored in the storage unit but depending on a network to which the service disclosure apparatus is connected when the search message is received.

14. The method according to claim 8, wherein, after a response limit to the search message has expired, a notification message indicating the service to be disclosed to the service using device to which the service is permitted to disclose by the disclosure permission is transmitted.

15. A non-transitory computer-readable storage medium storing a computer program for causing a service disclosure apparatus to disclose a service via a network to a service using device, the computer program comprising:
   receiving a search message transmitted from the service using device;
   transmitting a response message indicating the service to be disclosed to the service using device if identification information of the service using device is stored in a storage unit when the search message is received;
   displaying information about the service using device that transmitted the search message on a display unit;
   if a disclosure permission to disclose the service to the service using device whose information is displayed on the display unit is input, registering in the storage unit the identification information of the service using device to which the service is permitted to disclose by the input disclosure permission; and
   transmitting a message indicating the service to be disclosed to the service using device to which the service is permitted to disclose by the disclosure permission.

16. The non-transitory computer-readable storage medium according to claim 15, the computer program further comprising transmitting the response message to the service using device to which the service permitted to disclose by the disclosure permission before the response limit to the search message expires.

17. The non-transitory computer-readable storage medium according to claim 15, the computer program further comprising acquiring the information about the service using device that transmitted the search message, and displaying the information acquired according to an acquisition procedure.

18. The non-transitory computer-readable storage medium according to claim 15, wherein the computer program sets an amount of the service to be disclosed to the service using device based on a type of communication infrastructure used to communicate with the service using device.

19. The non-transitory computer-readable storage medium according to claim 15, wherein the computer program implements an operation unit for setting an amount of the service to be disclosed to the service using device.

20. The non-transitory computer-readable storage medium according to claim 15, wherein the response message indicating the service to be disclosed to the service using device is transmitted regardless of whether or not the identification information of the service using device is stored in the storage unit but depending on a network to which the service disclosure apparatus is connected when the search message is received.

21. The non-transitory computer-readable storage medium according to claim 15, wherein, after a response limit to the search message has expired, a notification message indicating the service to be disclosed to the service using device to which the service is permitted to disclose by the disclosure permission is transmitted.

* * * * *